US005635002A

United States Patent [19]

Oikawa et al.

[11] Patent Number: 5,635,002

[45] Date of Patent: Jun. 3, 1997

[54] METHOD OF PREVENTING ADHESION OF ADHESIVE SUBSTANCE, AND METHOD OF PREVENTING ADHESION OF NON-VULCANIZED RUBBER

[75] Inventors: Isamu Oikawa; Katsuhiko Maeda, both of Saitama-ken, Japan

[73] Assignee: Tokyo Silicone Co., Ltd., Saitama-ken, Japan

[21] Appl. No.: 463,059

[22] Filed: Jun. 5, 1995

Related U.S. Application Data

[62] Division of Ser. No. 257,440, Jun. 8, 1994, Pat. No. 5,466,510, which is a continuation of Ser. No. 694,407, May 1, 1991, abandoned.

[30] Foreign Application Priority Data

| | | | |
|---|---|---|---|
| May 11, 1990 | [JP] | Japan | 2-49480 |
| Feb. 26, 1991 | [JP] | Japan | 3-30900 |

[51] Int. Cl.$^6$ .............................. B32B 31/00; B05D 1/04

[52] U.S. Cl. .......................... 156/196; 156/153; 156/219; 427/421; 427/448; 427/452; 427/453; 427/455; 427/258; 427/270; 451/38

[58] Field of Search ............................. 156/60, 153, 196, 156/219, 244.25, 297; 427/258, 270, 271, 290, 421, 448, 452, 453, 455; 451/38, 48, 91

[56] References Cited

U.S. PATENT DOCUMENTS

| | | | |
|---|---|---|---|
| 3,620,895 | 11/1971 | Bailey et al. | 428/163 |
| 3,967,042 | 6/1976 | Laskin et al. | 428/422 |
| 4,411,943 | 10/1983 | Akao | 428/161 |
| 4,414,317 | 11/1983 | Culp et al. | 428/167 |

FOREIGN PATENT DOCUMENTS

| | | |
|---|---|---|
| 2708902 | 9/1977 | Germany . |
| 3009412 | 9/1981 | Germany . |
| 3721017 | 1/1988 | Germany . |
| 3825314 | 9/1989 | Germany . |
| 3834007 | 4/1990 | Germany . |
| 59-86995 | 5/1984 | Japan . |

*Primary Examiner*—Donald Loney

*Attorney, Agent, or Firm*—Sixbey Friedman Leedom & Ferguson; Thomas W. Cole

[57] ABSTRACT

Disclosed is a structure composed of a ragged base body with a ragged surface and a non-adhesive layer of a non-adhesive high polymer, in which the layer is fixed to at least the depressions of the ragged surface in such a way that the ragged profile of the body appears on the outer surface, reiterated by the layer. The ragged profile has a mean surface roughness Ra of 0.5 to 20 μm and the mean distance Z between the adjacent projections forming the ragged profile is 20 to 1000 μm. The non-adhesive high polymer may be a silicone high polymer having a silicone oil content of 10% or less. It has an effective surface tension of 32 dyn/cm or less. As the structure has improved releasing characteristics, adhesion of an adhesive substance to the structure may be effectively prevented without using any conventional releasing agent.

10 Claims, 2 Drawing Sheets

METHOD OF PREVENTING ADHESION OF ADHESIVE SUBSTANCE, AND METHOD OF PREVENTING ADHESION OF NON-VULCANIZED RUBBER

This application is a divisional of U.S. patent application Ser. No. 08/257,440 filed Jun. 8, 1994 now U.S. Pat. No. 5,466,510, which in turn is a continuation of U.S. patent application Ser. No. 07/694,407, filed May 1, 1991, now abandoned.

BACKGROUND OF THE INVENTION

1. Field of the Invention

The present Invention relates to a structure and a method for preventing adhesion of an adhesive substance. In particular, it relates to structures such as containers for adhesive substances (e.g., reaction or mixing containers, vats, etc.), steel belts for cookies or the like to be baked or roasted on, conveyer pipes, tools for manufacture of tires, parts of machinery for manufacture of tires, etc., cutters for cutting adhesive substances, such as adhesive-coated sheet material or non-vulcanized rubber, and to a method of preventing adhesion of non-vulcanized rubber.

2. Description of the Related Art

When an adhesive substance is cut with a cutter, the cut dust from the adhesive material tends to adhere to the cutting edge of the cutter so that the cutter becomes dull. In order to overcome the problem, the method of applying a releasing agent, such as silicone oil, water or the like, to the cutting edge of a cutter has heretofore been employed for the purpose of preventing the cut dust from adhering to the cutter.

When this method is used, however, the releasing agent penetrates into the adhesive substance, when the substance is cut, causing failure in adhesion of the adhesive substance to an article. For example, in the case of insulating tape, this approach causes the problem of insulation failure. When water is used as the releasing agent in this method, it causes the problem of rusting of the cutting edge. In order to overcome these problems, has been proposed that the releasing agent be removed has been after cutting so as to avoid adhesion failure or insulation failure caused by the releasing agent used. However, when silicone oil is used as a releasing agent, post-removal of the used silicone oil is difficult. On the other hand, when water is used, a step of drying the adhesive substance after cutting is necessary, which results in lowering of productivity. Furthermore, removal of the used releasing agent causes various other problems.

Regarding containers for adhesive, steel belts for cookies or the like to be baked or roasted, conveyer pipes and the like, the inner surface of the container, the surface of the steel belt or the inner surface of the conveyer pipe is coated with a releasing agent such as an oil or the like, for the purpose of preventing adhesion of the adhesive substance. However, the method of using such a releasing agent has a problem in that the coated item must be newly coated with fresh releasing agent whenever the releasing efficacy of the releasing agent coating declines. Another method, i.e., coating with a fluorine resin the part which needs to have releasing capability, has been proposed. When this method is used, however, since adhesion of the cut dust is prevented only by the non-adhesive property of the fluorine resin, the releasing capability imparted by the resin is, inconveniently, insufficient. In industrial equipment for manufacturing tires, air is jetted out so as to prevent contact between non-vulcanized rubber and various tools, or, a large number of grooves are provided in the part which is brought into contact with the non-vulcanized rubber, or, the part is knurled so as to reduce the surface area of the part which comes into contact with the non-vulcanized rubber. However, none of the known means is satisfactory.

SUMMARY OF THE INVENTION

The present invention was made for the purpose of overcoming the above-mentioned problems. Therefore, the object of the present invention is to provide a structure having a cutter or the like both having greatly improved releasing characteristics, without using any releasing agent.

Another object of the present invention is to provide a method of preventing adhesion of non-vulcanized rubber in a production line for manufacturing rubber products such as tires.

In order to attain these objects, the structures of the present invention are each composed of a base body with a rough, or ragged surface and have a non-adhesive layer on that surface, made of a non-adhesive high polymer, and, the non-adhesive layer is fixed to at least the depressions of the ragged surface in such a way that the ragged profile of the surface of the body is reiterated and appears on the outer surface of the non-adhesive layer.

The outer surfaces of the structures having a cutter or the like of the present invention, comprising the ragged profile of the surface of the body and the non-adhesive high polymer layer fixed thereto, are constituted in such a way that the surface roughness Ra thereof falls within the range of from 0.5 μm to 20 μm and that the mean distance Z between the adjacent projections thereof falls within the range of from 20 μm to 1000 μm. As the non-adhesive high polymer for the non-adhesive layer, a silicone high polymer material having a silicone oil content of 10% or less may be used.

As the non-adhesive high polymer for the layer, one having a surface tension of 32 dyn/cm or less is effectively used.

In accordance with the method of the present invention for preventing adhesion of a non-vulcanized rubber, the surface of the part which is to be brought into contact with a non-vulcanized rubber is formed to have a ragged profile and a non-adhesive high polymer layer is fixed to at least the depressions of the ragged profile in such a way that the ragged profile is reiterated and appears on the surface of the part as the ragged outer surface of the polymer layer, and as a result of the non-adhesive characteristics of this outer surface the non-vulcanized rubber does not adhere to the part. In accordance with this method, the outer surface of the part which is to be brought into contact with non-vulcanized rubber, comprising the ragged profile of the body surface and the non-adhesive high polymer layer fixed thereto, is constituted in such a way that the surface roughness Ra thereof falls within the range of from 0.5 μm to 20 μm and that the mean distance Z between the adjacent projections thereof falls within the range of from 20 μm to 1000 μm.

Specifically, in the structures of the present invention, the surface of the base body has a ragged profile, and a non-adhesive layer of a non-adhesive high polymer material is fixed to at least the depressions of the ragged surface of the base body in such a way that the ragged profile of the body is reiterated and appears on the surface of the non-adhesive layer. Accordingly, at least the depressions of the ragged profile of the surface of the structures of the present invention are coated with a non-adhesive high polymer material, and an adhesive substance to be applied to the structure does not adhere to the surface of the structure because of the synergistic effect of the ragged profile of the surface and the non-adhesiveness of the high polymer layer. It is preferred that the top of each projection of the ragged profile not be sharp but rather, curved, or more preferably, rounded or flattened. If desired, the entire ragged surface may he covered with the non-adhesive polymer layer, provided that the ragged profile is reiterated and appears on the surface of the coated layer.

Coating with the non-adhesive high polymer may be effected by any ordinary method. For instance, the surface of the structure to be coated is pre-degreased by treatment with a solvent, alkali or acid or by heat-treatment, in accordance with the kind of material it is made of, and thereafter is activated by blasting, etching or discharging. Then, the thus activated surface is coated with ceramic, nickel, nickel aluminum alloy, or the like by thermal spraying to form a ragged profile thereon. Next, the ragged profile is coated with a non-adhesive high polymer material by spray-coating or electrostatic coating and, if desired, thereafter dried and fired to form a non-adhesive layer over the ragged profile. The firing conditions and cooling conditions nay be determined in accordance with the kind of non-adhesive polymer material, the kind of structural material and the desired characteristics of the non-adhesive layer to be formed. In place of thermal spraying, the ragged profile may also be formed by blasting, pressing or fusing.

Alternatively, the non-adhesive layer may also be formed by sticking a film comprised of a non-adhesive polymer material onto the ragged surface of the base body.

The ragged profile on the outer surface of the structures of the present invention is effectively formed in such a way that the mean surface roughness Ra thereof within the range of from 0.5 μm to 20 μm and that the mean distance Z between the adjacent projections thereof falls within the range of from 20 μm to 1000 μm. The reason why the mean surface roughness Ra is defined to be 0.5 μm or more is because if it is less than 0.5 μm, the surface would be almost flat so that it would have a non-adhesiveness nearly comparable to that of the conventional fluorine resin-coated layer. If, on the other hand, the surface roughness Ra is more than 20 μm, the surface would be, inconveniently, too rough. The reason why the mean distance Z is defined to fall within the range of from 20 μm to 1000 μm is because, if it is more than 1000 μm, the cut dust possibly adhering to the surface of the cutter tends to fit into the concavities thereon, and does not easily drop therefrom. If, on the contrary, it were less than 20 μm, the surface would be almost flat, resulting in the same problem as mentioned above.

As the non-adhesive high polymer material used for the non-adhesive layer on the ragged profile, a silicone high polymer material having a silicone oil content of 10% or less may be used. If the silicone content is more than 10% the durability of the coated film is unfavorably low. The non-adhesive high polymer material should preferably be one having a surface tension of 32 dyn/cm or less. The reason why the surface tension is defined to be 32 dyn/cm or less is because, if it were more than 32 dyn/cm, the hardened polymer layer would not display sufficient non-adhesiveness.

Since the surface of the structure of the present invention has a ragged profile, the structure of the invention may be modified so as to have desired abrasion-resistance, corrosion-resistance, thermal conductivity, electric conductivity and stain-resistance, by properly defining and controlling the shape of the ragged profile.

As mentioned above, in accordance with the present invention, since the surface of the structure is comprised of a body surface having a ragged profile which is coated with a non-adhesive high polymer layer in such a way that the outer surface thereof also has a ragged profile, the structure or cutter of the invention has the function of effectively preventing an adhesive substance from adhering thereto, without the use of any releasing agent.

In addition, when a part which is brought into contact with non-vulcanized rubber is formed to have the above-mentioned structure, adhesion of non-vulcanized rubber to the part may effectively be prevented.

Therefore, the structure of the invention may effectively be used in an industrial production line for manufacturing rubber products such as tires and so on, in which a non-vulcanized rubber does not adhere to conveyer ducts or machining parts having the structure of the present invention.

DESCRIPTION OF THE PREFERRED EMBODIMENT

Figure 1:
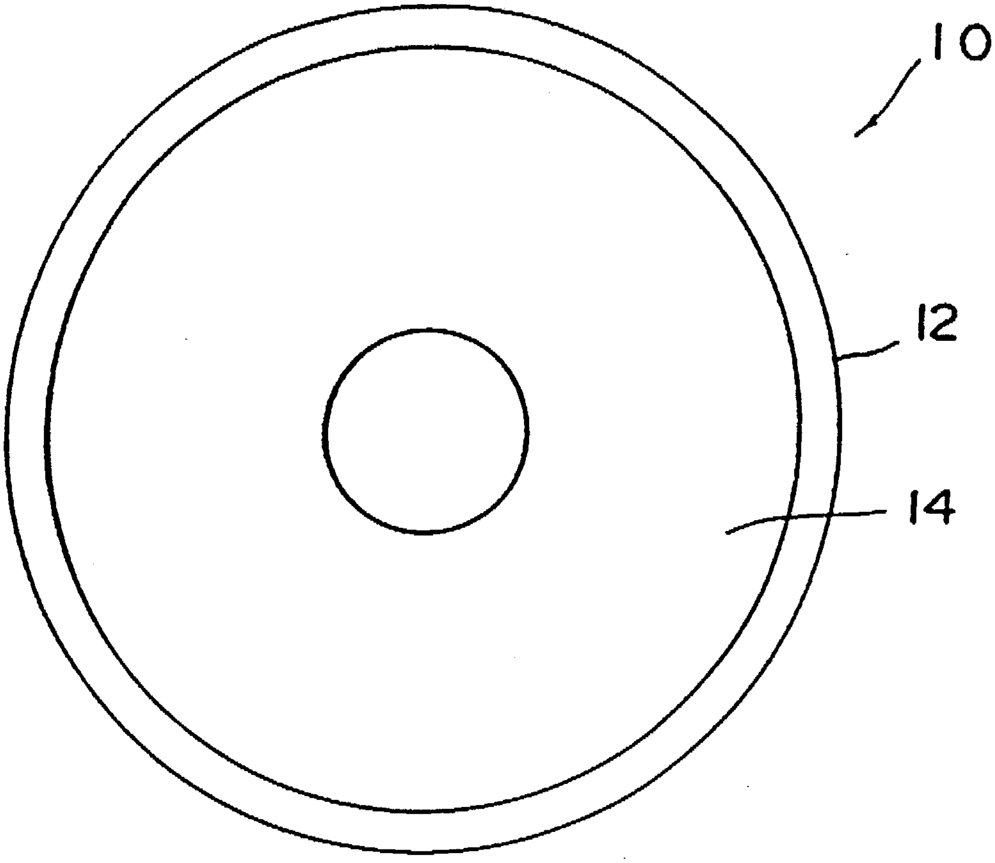
FIG. 1 is a plane view to show one embodiment of the present invention.
Figure 2:
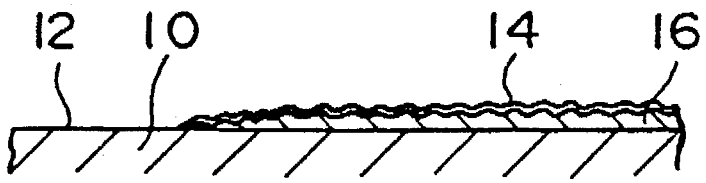
FIG. 2 is a partly enlarged cross-sectional view of FIG. 1.
Figure 3:
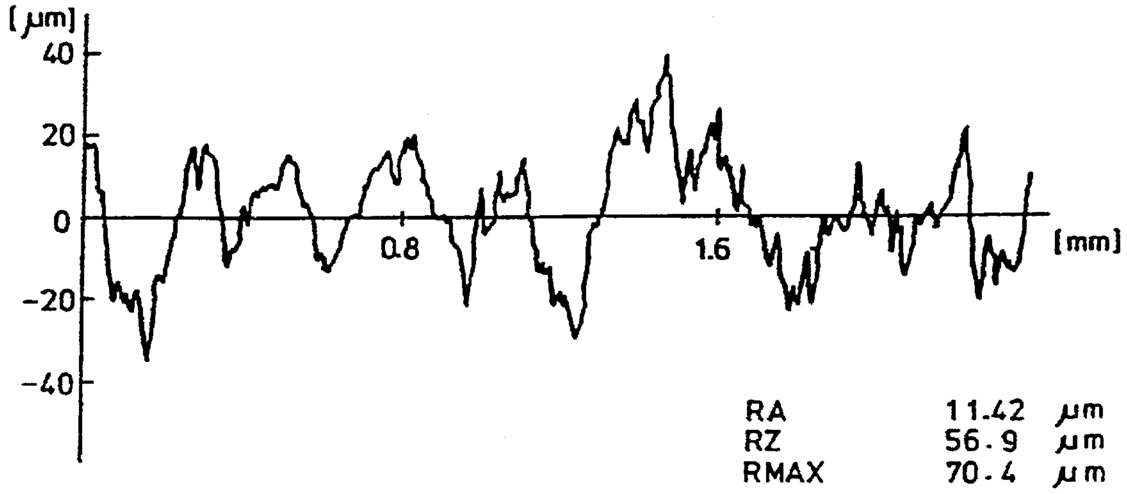
FIG. 3 is a graph to show the result of measurement of the surface roughness of the embodiment of FIG. 1 and FIG. 2.

Next, one embodiment of the present invention will be explained in detail with reference to the drawings attached hereto. The embodiment demonstrates application of the present invention to a cutter. Reference is made to FIG. 1 and FIG. 2. A round-bladed cutter (10) is degreased with trichlene and then blasted, and then a portion thereof having a determined width (for example, 1 to 2 mm) as measured from the edge (12) is masked, and a melt of a fine ceramic powder consisting essentially of alumina is deposited on the non-masked portion by melt-deposition, to thereby form a ragged layer (16) having a thickness of approximately from 40 to 60 m. The surface of the ragged layer (16) is formed to have a ragged profile having a mean roughness Ra of approximately from 5 to 8 μm. In the present inventor's experiments, it has been found that the practical range of the mean roughness Ra of the surface of the ragged profile is from 5 to 17 m. The surface of the ragged layer (16) is coated with a silicone high polymer layer (14) having a thickness of approximately 10 μm, the layer (14) being formed on the surface by applying a silicone high polymer thereto followed by firing it at 120° C. or so for about 60 minutes. As the silicone high polymer layer (14) is very thin, the ragged profile of the ragged layer (16) is reiterated and appears on the surface of the silicone high polymer layer (14). The mean roughness Ra of the surface was measured with a surface tester (manufactured by Mitsutoyo Co.) to obtain the results shown in FIG. 3. In FIG. 3, RZ indicates a 10-point mean roughness; and RMAX indicates the maximum roughness.

Using the cutter having the constitution mentioned above, a lengthy strip of adhesive backed paper (composed of a paper seal, one surface of which has been thinly coated with an adhesive sealant, and the other surface of which has been printed with letters and so on, and a silicone-coated release paper stuck to the adhesive surface of the paper seal), was cut at regular intervals into pieces each having a determined width, during which procedure no cut dust adhered to the cutter or to the cut pieces. For comparison, the same lengthy strip was cut with a conventional cutter under the same conditions as above, whereupon cut dust adhered to the products, resulting in some defective products. Additionally, the adhesive sealant adhered to the cutting edge of the cutter, in the latter comparative case, so that the cutter became dull and the edge thereof needed cleaning several times a day.

Figure 4:
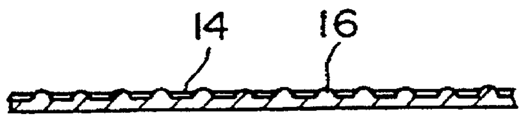
FIG. 4 is a partly enlarged cross-sectional view to show another embodiment of the present invention.

As another embodiment of the present invention, the silicone high polymer layer (14) may be applied to only the depressions of the ragged profile, as shown in FIG. 4.

As explained in detail in the above, in accordance with the present invention, since the region near the cutting edge of the cutter is coated with a silicone high polymer layer having a ragged profile, the cutter may be used for cutting an adhesive article without using any releasing agent. Accordingly, when the cutter of the invention is used for cutting an adhesive article, the cut edge of the cut product may be kept dry so that neither the cut dust nor the adhesive material adheres to the cutter. For this reason, the adhesive articles cut with the cutter of present invention do not suffer from adhesion failure and they do not need any drying step, and therefore the performance of the cutter of the present invention is enhanced. Additionally, since the surface of the region near the cutting edge of the cutter of the invention is formed to have a ragged profile, the cutter itself does not heat up during use, because the region having the ragged profile has a heat-releasing effect, and therefore fusion or melting of the adhesive from the adhesive article to be cut is effectively prevented during the cutting procedure. Moreover, as the cutting edge is coated, it is prevented from rusting.

In the embodiment described above, a silicone high polymer was used as the non-adhesive high polymer material for forming the non-adhesive high polymer layer fixed to the ragged base body. However, this is not a limitation of the invention, as any other silicone rubber or fluorine rubber may of course be used.

In the embodiment described above, the present invention was applied to a cutter. This, however, is not a limitation. The present invention may also be applied to various containers for keeping adhesives and the like (for example, reaction or stirring containers, vats, printing ink containers, adhesive-transporting drums), or to steel belts for cookies and the like to be baked or roasted, conveyer pipes, and weather protectors to be applied to outdoor poles or exterior walls of buildings.

Additionally, the present invention may further be applied to leaf springs, rails, hangers, rollers, cutting edges of cutters, receivers of cutters, guide plates, guide rollers, motoring rollers, joint tables and vulcanizers to be used in a production line for manufacturing tires. In such cases, Ra was found to fall within the range of from 9.04 to 11.46 μm and Z to fall within the range of from 42.1 to 52.8 μm.

As a result of applying the present invention to parts which are brought into contact with non-vulcanized rubber in a tire manufacturing production line, the non-vulcanized rubber did not adhere to the parts, and therefore the conveyance of the non-vulcanized rubber was effected very smoothly. Additionally, in this case, cut dust from the non-vulcanized rubber did not adhere to any parts anywhere in the production line, and therefore, the amount of required maintenance of the production line was considerably reduced.

While the invention has been described in detail and with reference to specific embodiments thereof, it will be apparent to one skilled in the art that various changes and modifications can be made therein without departing from the spirit and scope thereof.

What is claimed is:

1. A method of preventing adhesion of an adhesive substance to a part which is brought into contact with said adhesive substance, comprising the step of forming a surface of said part to have a ragged surface profile including peaks and depressions, wherein a non-adhesive high polymer is fixed to at least the depressions of said ragged surface profile of said part such that said ragged profile of said part is present on an outer surface of said part, for preventing said adhesive substance from adhering to said part, and wherein said ragged surface profile of said part and said non-adhesive high polymer fixed thereto has a mean surface roughness Ra that falls within range of from 0.5 μm to 20 μm and a mean distance Z between adjacent peaks that fails within a range from 20 μm to 1000 μm.

2. A method of preventing adhesion of an adhesive substance to a part which is brought into contact with said adhesive substance as claimed in claim 1, in which said non-adhesive high polymer is a silicone high polymer having a silicone oil content of 10% or less.

3. A method of preventing adhesion of an adhesive substance to a part which is brought into contact with said adhesive substance as claimed in claim 1, in which said non-adhesive high polymer is one having a surface tension of 32 dyn/cm or less.

4. A method of preventing adhesion of an adhesive substance to a part which is brought into contact with said adhesive substance as claimed in claim 1, in which said ragged surface profile of the surface of said part is formed by thermal spraying or blasting.

5. A method of preventing adhesion of an adhesive substance to a part which is brought into contact with said adhesive substance as claimed in claim 1, in which said ragged surface profile of the surface of said part is formed by thermal spraying onto the surface of the part a fine ceramic powder selected from the group consisting of alumina, nickel and a nickel aluminum alloy.

6. A method of preventing adhesion of an adhesive substance to a part which is brought into contact with said adhesive substance as claimed in claim 1, in which said layer of non-adhesive high polymer is fixed to said ragged surface profile of said part such that said layer coats one of: the whole of said ragged surface profile of said part, and only the depressions of said ragged surface profile.

7. A method of preventing adhesion of a non-vulcanized rubber to a part which is brought into contact with said non-vulcanized rubber, comprising the steps of forming a surface of said part to have a ragged surface profile including peaks and depressions, wherein a non-adhesive high polymer is fixed to at least the depressions of said ragged surface profile of said part such that said ragged profile of said part is presented on an outer surface of said part, for preventing said non-vulcanized rubber from adhering to said part, and wherein said ragged surface of said part and said non-adhesive high polymer fixed thereto has a mean surface roughness Ra that falls within a range of from 0.5 μm to 20 μm and a mean distance Z between adjacent peaks that falls within a range of 20 μm to 1000 μm.

8. A method of preventing adhesion of non-vulcanized rubber to a part which is brought into contact with said non-vulcanized rubber as claimed in claim 7, in which said non-adhesive high polymer is a silicone high polymer having a silicone oil content of 10% or less.

9. A method of preventing adhesion of non-vulcanized rubber to a part which is brought into contact with said non-vulcanized rubber as claimed in claim 7, in which said non-adhesive high polymer is one having a surface tension of 32 dyn/cm or less.

10. A method of preventing adhesion of non-vulcanized rubber to a part which is brought into contact with said non-vulcanized rubber as claimed in claim 7, wherein said part is formed of rubber.

* * * * *